United States Patent [19]

Sutera et al.

[11] Patent Number: 4,651,163

[45] Date of Patent: Mar. 17, 1987

[54] WOVEN-FABRIC ELECTRODE FOR INK JET PRINTER

[75] Inventors: Richard Sutera, Hauppauge, N.Y.; Roger Burchett, Miamisburg, Ohio

[73] Assignee: Burlington Industries, Inc., Greensboro, N.C.

[21] Appl. No.: 736,076

[22] Filed: May 20, 1985

[51] Int. Cl.[4] .................... G01D 15/18

[52] U.S. Cl. .................... 346/75; 174/117 M

[58] Field of Search .................... 346/75; 174/117 M

[56] References Cited

U.S. PATENT DOCUMENTS

| | | | |
|---|---|---|---|
| 2,433,239 | 12/1947 | Rasero | 174/117 M |
| 3,373,437 | 3/1968 | Sweet et al. | 346/75 |
| 3,560,988 | 2/1971 | Krick | 346/1.1 |
| 3,579,721 | 5/1971 | Kaltenbach | 425/3 |
| 3,582,537 | 6/1971 | Perreault | 174/117 M |
| 3,596,275 | 7/1971 | Sweet | 346/1.1 |
| 3,836,912 | 9/1917 | Ghougasian et al. | 346/75 |
| 3,886,564 | 5/1975 | Naylor, III et al. | 346/75 |
| 3,955,203 | 5/1976 | Chocholaty | 346/75 |
| 3,975,741 | 8/1976 | Solyst | 346/75 |
| 4,084,164 | 4/1978 | Alt et al. | 346/75 |
| 4,122,458 | 10/1978 | Paranjpe | 346/75 |
| 4,138,688 | 2/1979 | Heard et al. | 346/75 |
| 4,222,058 | 9/1980 | Gudorf | 346/75 |
| 4,249,189 | 2/1981 | Fernalld, Jr. | 346/75 |
| 4,291,340 | 9/1981 | Donahue | 358/296 |
| 4,334,232 | 6/1982 | Head | 346/75 |
| 4,368,475 | 1/1983 | Donahue | 346/75 |
| 4,374,387 | 2/1983 | Iyoda et al. | 346/75 |
| 4,378,631 | 4/1983 | Head et al. | 29/825 |
| 4,419,674 | 12/1983 | Bahl et al. | 346/75 |
| 4,427,986 | 1/1984 | Iyoda et al. | 346/1.1 |
| 4,560,991 | 12/1985 | Schutrum | 346/75 |

*Primary Examiner*—E. A. Goldberg
*Assistant Examiner*—Gerald E. Preston
*Attorney, Agent, or Firm*—Nixon & Vanderhye

[57] ABSTRACT

An electrode for use in a fluid jet printing apparatus to generate an electrostatic field through which droplet streams pass includes a woven fabric structure having plural electrically-conductive fibers interwoven with plural electrically-insulative fibers. An area of the electrically-conductive fibers is positionable adjacent to the fluid droplet streams to thereby generate the electrostatic field. A conductive support member provides wire-to-ground capacitance which attenuates possible "cross-talk" due to inherent wire-to-wire capacitances. The electrode structure is particularly well suited for use as a charge electrode in a fluid jet printing device.

30 Claims, 6 Drawing Figures

FIG. 1
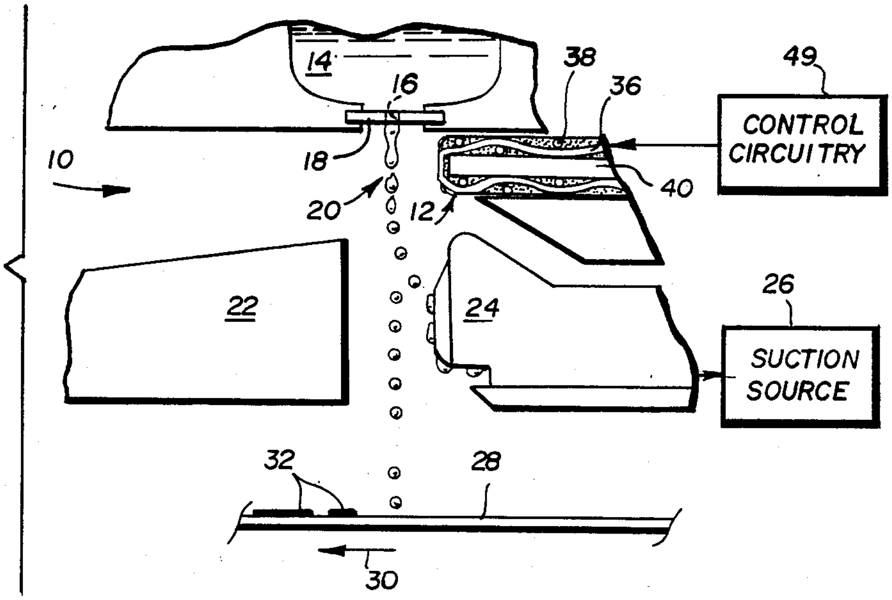
FIG. 3
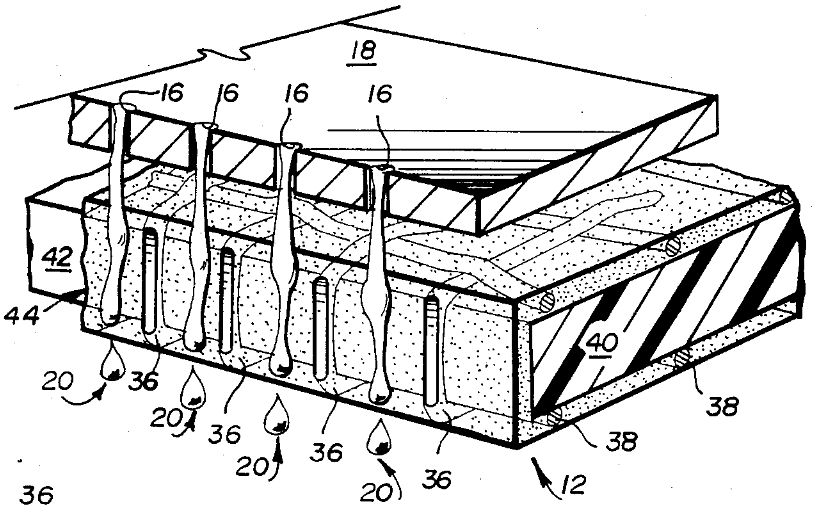
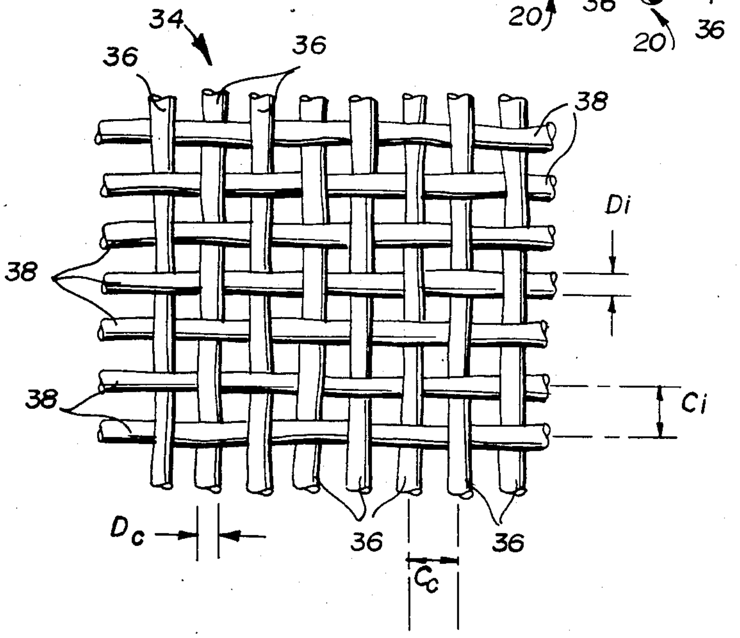
FIG. 2

WOVEN-FABRIC ELECTRODE FOR INK JET PRINTER

FIELD OF INVENTION

The present invention generally relates to non-contact fluid printing devices conventionally known as "ink jet" or "fluid jet" printers. More particularly, the present invention relates to an electrode for use in a fluid jet printing apparatus which includes a fabric-like structure having plural electrically-conductive fibers extending in one direction and plural electrically-insulating fibers interwoven with the electrically-conductive fibers. The electrically-insulating fibers mutually insulate the electrically-conductive fibers one from another in spaced substantially parallel alignment. An area of the electrically-conductive fibers is positionable adjacent and substantially parallel to the plural droplet streams issuing from the fluid-jet device so as to electrostatically charge selected droplets in the streams.

BACKGROUND AND SUMMARY OF THE PRESENT INVENTION

Non-contact printers which utilize electrostatically charged and non-charged droplets are generally known as evidenced by U.S. Pat. Nos. 3,373,437 to Sweet et al; 3,560,988 to Krick; 3,579,721 to Kaltenbach; and 3,596,275 to Sweet. Typically, fluid filaments of e.g. ink, dye, etc. are issued through respective orifices of an orifice plate. An array of individually controllable electrostatic charging electrodes is disposed downstream of the orifice plate along the so-called "droplet formation zone." In accordance with known principles of electrostatic induction, the fluid filament is caused to assume an electrical potential opposite in polarity and related in magnitude to the electrical potential of its respective charging electrode. When a droplet of fluid is separated from the filament, this induced electrostatic charge is trapped on and in the droplet. Thus, subsequent passage of the charged droplet through an electrostatic field will cause the droplet to be deflected away from a normal droplet path towards a droplet catching structure. Uncharged droplets, on the other hand, proceed along the normal droplet path and are eventually deposited upon a receiving substrate.

Prior proposals for providing "wire-like" electrode structures exist in the art. For example, U.S. Pat. No. 4,419,674 to Bahl et al discloses the use of an insulating substrate having notches cut into opposing end surfaces thereof, the notches at one end of the substrate being typically spaced farther apart than those at the other end so as to facilitate electrical connections. A conductive filament or wire is then wrapped around the substrate from one notch/surface to the next, the wires being subsequently severed at the connector end so as to form separate electrical circuits. The wire segments wrapped around the electrode end of the substrate are fixed in place (e.g. with epoxy or the like) and then lapped or otherwise machined so as to present flat coplanar individual charging electrode surfaces along the outer edge of the assembled structure.

Other proposals in the art exist relating to the use of woven fabrics consisting solely of conductive fibers as the constituent element in various electrode structures as evidenced by U.S. Pat. Nos. 3,955,203 to Chocholaty; 4,084,164 to Alt et al; and 4,374,387 to Iyoda et al.

The electrode of the present invention is preferably utilized as a charge electrode in a fluid jet printing apparatus whereby selected fluid droplets in a plurality of fluid droplet streams are selectively charged by means of an electrostatic charge field generated by suitable control circuitry. A woven fabric-like structure comprises an essential feature of the present novel electrode. The fabric-like structure includes a plurality of substantially parallel, but spaced apart, electrically-conductive warp fibers and a second plurality of weft fibers disposed substantially transverse relative to the warp fibers. The weft fibers are preferably provided with means to mutually electrically insulate the electrically-conductive warp fibers one from another and to maintain the warp fibers in spaced, substantially parallel alignment. The woven fabric structure is then wrapped around or otherwise attached to a substrate support so as to establish, at a forward end thereof, an area which is positionable adjacent to the fluid droplet streams. The substrate, although insulated from the electrode wires, is preferably a grounded conductor in close proximity thereto so as to provide a wire-to-ground capacitance which minimizes the "cross-talk" otherwise possible due to wire-to-wire capacitance.

Upon the application of high voltage to the electrically-conductive warp fibers, an electrostatic field will be established along the area at the forward end of the substrate support so as to generate an electrostatic field through which the fluid droplet streams pass. When utilized as a charge electrode, the present invention thus enables selected ones of the fluid droplets to be electrostatically charged.

While the present invention finds particular utility as a charge electrode in a fluid jet printing apparatus, those in this art may recognize its usefulness as an electrode in other applications. Thus, further aspects and advantages of the present invention will become more clear after careful consideration is given to the detailed description of the presently preferred exemplary embodiments thereof which follows.

BRIEF DESCRIPTION OF THE ACCOMPANYING DRAWINGS

Reference will hereinafter be made to the accompanying drawings wherein like reference numerals throughout the various figures denote like structural elements and wherein:

FIG. 1 is a schematic elevational view of a fluid jet printing apparatus in which the electrode of the present invention is useable;

FIG. 2 is a plan view of the woven fabric structure of the present invention;

FIG. 3 is a schematic perspective view showing the electrode of the present invention operatively positioned adjacent to plural fluid droplet streams;

DETAILED DESCRIPTION OF THE PRESENTLY PREFERRED EXEMPLARY EMBODIMENTS

Figure 6:
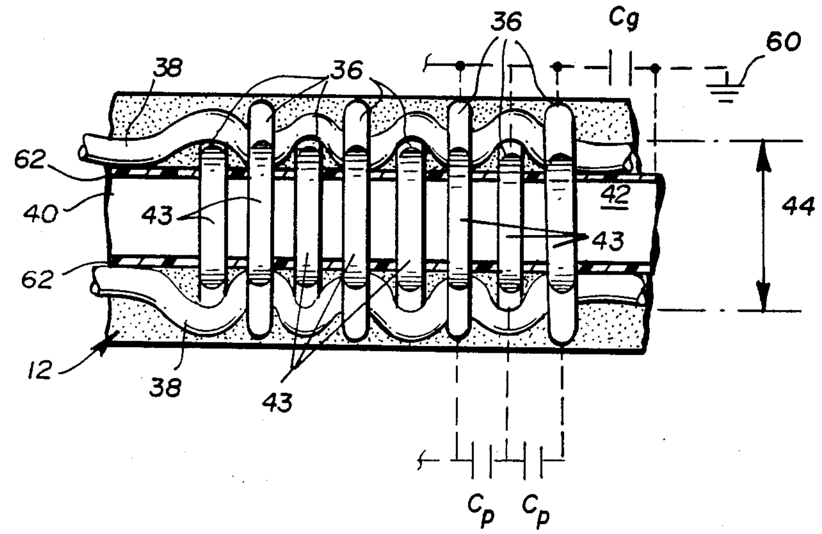
FIG. 6 is a representative front elevational view of the electrode of the present invention mounted about a conductive substrate and including a schematic depiction of wire-to-wire capacitances Cp and wire-to-ground capacitances Cg.

A fluid jet printing apparatus 10 utilizing the present invention as a charge electrode 12 is depicted in accompanying FIG. 1. As shown, fluid in a fluid reservoir 14 issues through orifices 16 formed in orifice plate 18 so as to form fluid droplet streams 20 (only one stream 20 shown in FIG. 1 for purposes of illustration). The droplet stream 20 encounters the electrostatic charge field established by charge electrode 12 so that selected droplets in stream 20 can be electrostatically charged as desired.

The droplet streams 20 then pass through an electrostatic deflection field. Previously-charged droplets are thus deflected by the deflection electrode 22 towards a droplet catcher 24, the deflected and caught droplets then being removed from droplet catcher 24 by means of a suction source 26. Uncharged droplets, on the other hand, proceed towards print substrate 28 (moving in the direction of arrow 30 relative to droplet stream 20) so as to be deposited thereon and thus print desired indicia, patterns etc. generally noted by reference numeral 32.

The woven fabric 34 which forms an important part of the electrode of the present invention is depicted in accompanying FIG. 2. Fabric 34 is comprised of plural electrically-conductive warp fibers 36 interwoven with plural electrically-insulative weft fibers 38. The terms "warp" and "weft" are being used herein merely to differentiate between the relative fiber directions and thus are nonlimiting to the manner in which the fabric 34 is produced. The electrically-conductive warp fibers 36 are disposed along parallel spaced-apart axes relative to one another while the electrically-insulative weft fibers 38 are interwoven with and disposed substantially transverse to the electrically-conductive warp fibers 36.

The relative diameters $D_c$ and $D_i$ of the warp fibers 36 and weft fibers 38, respectively, will at least in part determine the relative spacings between adjacent fibers 36 and 38. Preferred for the present invention (to permit proper print resolution in a fluid jet apparatus) are nominal fiber diameters of about 5 mils so as to achieve nominal center-to-center spacings ($C_c$ and $C_i$) between the fibers of about 7 mils. Other nominal diameters to achieve any suitable center-to-center spacings between adjacent fibers 36 and 38 are possible, the particular selection of fiber size being dependent upon the application in which the fabric 34 is used.

Any suitable electrically-conductive and electrically-insulative materials can be utilized for the fibers 36 and 38, respectively. Preferred however for fibers 36 are metallic monofilament fibers of e.g. copper, stainless steel, or brass. Materials for fibers 38 include any polymeric material which is electrically-insulating and which will not be degraded in the environment of its intended usage. By way of example only, fibers 38 can be monofilament polymeric fibers of polyolefins (e.g. polyethylene, polypropylene, etc.), polyethylene terephthalates, acrylics (e.g. polymethyl methacrylate), polysulfones, polyamide-imides and polyimides.

Electrically-insulative fibers 38 could also be formed of metallic materials in which case they include a sheath of insulating material as is customary for insulated electrical wires. Moreover, electrically-conductive fibers 36 could also have a sheath of insulating material formed thereon provided that a portion of the sheath is removed in that area of each conductive fiber intended to be positionable adjacent the droplet streams in a fluid jet device, as will be discussed in greater detail below with reference to FIG. 6.

Any suitable weaving technique can be employed to produce fabric 34. Thus, conventional satin and twill weaves in addition to the plain weave shown in FIG. 2 could be advantageously used, if desired.

Figure 4:
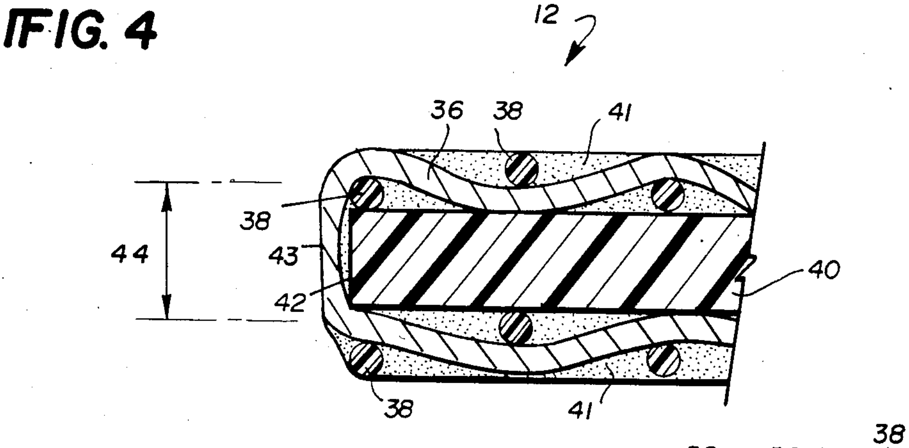
FIG. 4 is a cross-sectional side elevational view of one embodiment of the electrode of the present invention.

The structure of charge electrode 12 of the present invention can be more clearly seen by reference to FIGS. 3–4 which is depicted in a greatly-enlarged manner for clarity of illustration. The charge electrode 12 of the present invention generally includes the woven fabric 34 attached to support member 40 by means of any suitable adhesive material 41. Support member 40 is electrically insulated from fabric 34 and is preferably formed entirely of a substantially rigid (i.e. self-supporting), electrically-insulating material, such as those materials described above with reference to fibers 38. Support member 40 could however be formed of any other material as long as support member 40 is electrically insulated from the fabric 34 such as, for example, by means of a layer of electrically-insulating material formed over a core of otherwise electrically-conducting material.

Support member 40 defines a forward face 42 for positioning the electrically-conductive wires 36 adjacent and substantially parallel to the plural droplet streams 20. Those portions of fibers 36 positioned forwardly of face 42 are preferably lapped or otherwise machined so as to form, for each fiber 36, an individual substantially planar charge surface 43. The co-planar vertical dimension of the charge surfaces 43 together establish an effective charge area which is diagramatically represented as numeral 44 in FIG. 4. The charge area 44 of the individual electrically-conductive fibers 36 is thus positioned operatively adjacent to the plural droplet streams 20 so as to generate an electrostatic charge field through which the droplet streams 20 pass.

Since each electrically-conductive fiber 36 is positioned in its respective charge area 44 so as to be in substantially parallel alignment with droplet streams 20, each fiber 36 will thus function as an individually controllable charge electrode. However, exact one-to-one registration between a droplet stream 20 and a particular one of fibers 36 in the charge area is not essential even though such registration is shown in FIG. 3. Thus, an amount of "misregistration" between the droplet streams 20 on the one hand (which may even substantially outnumber the electrode fibers 36) and individual fibers 36 in the charge area 44 on the other hand is permissible, as is described in commonly-owned U.S. application Ser. No. 501,785 to Rodger L. Gamblin filed June 7, 1983, which application is hereby incorporated by reference.

The individual electrically-conductive fibers 36 are electrically connected to suitable control circuitry 49 of the fluid jet apparatus 10 (see FIG. 1) by any conventional connection means, such as a conventional clamp-type connector (not shown).

Figure 5:
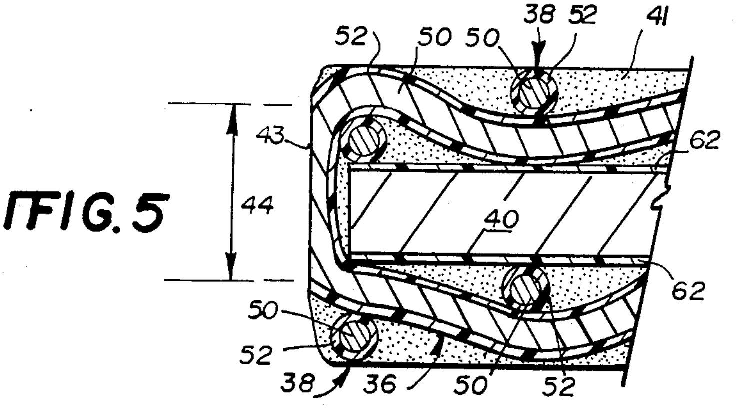
FIG. 5 is a cross-sectional side elevational view of another embodiment of the present invention.

A further embodiment of the present invention is shown in accompanying FIG. 5 and is substantially similar to the embodiment described above with reference to FIGS. 3–4 with the principal exceptions that support 40 is formed of an electrically-conductive material (e.g. stainless steel) while each of fibers 36, 38 includes an electrically-conductive core 50 surrounded by a sheath 52 of electrically-insulating material. Thus, sheath 52 electrically insulates fibers 36 one from another and from support 40. Similar to the embodiment described with reference to FIG. 3–4, the embodiment of FIG. 5 also includes portions of fibers 36 which are lapped or otherwise machined so as to form a planar charge surface 43 for each fiber 36. Thus, charge surfaces 43 likewise establish a charge area 44 which is positionable adjacent droplet streams 20 for selectively charging individual fluid droplets.

The embodiments of the electrode shown in FIGS. 5 and 6 utilize a substrate support 40 formed from an electrically-conductive material and thus provide several advantages over the use of an electrically-insulative material for substrate support 40 (i.e. as compared to the embodiment shown in FIG. 4) as will be explained below with particular reference to FIG. 6.

In an array of closely spaced charge electrodes also having closely spaced individual fibers 36 disposed parallel to one another for some distance, wire-to-wire capacitances Cp will inherently exist between adjacent ones of conductive fibers 36. Where each fibers 36 is connected to an independent electrical drive circuit via pattern control circuitry 49 (see FIG. 1), a finite impedance relative to a reference ground (e.g. due to resistance and inductance of fibers 36 and due to impedance of the drive circuitry) permits a changing voltage signal on one of the fibers 36 to couple via Cp to adjacent fibers 36. This "cross-talk" of the fibers 36 may cause degradation of print quality of the printing apparatus 10 due to a loss of resolution (e.g. because of extended fringe fields which may partially charge some drops and/or disturb their trajectory along the expected normal droplet flight path).

A reduction of such "cross-talk" can be achieved by use of an electrically-grounded substrate 40 formed of an electrically-conductive material (e.g. stainless steel) as shown in FIGS. 5 and 6. In addition to providing excellent mechanical support, conductive substrate 40 also creates a wire-to-ground capacitance Cg from each wire 36 to ground 60. Such structure thus forms a capacitive voltage divider which attenuates otherwise coupled "cross-talk" signals. In addition, Cg tends to shunt to ground 60 a portion of the high frequency energy delivered by arcs due to momentary virtual short circuits from one of the fibers 36 to other fibers 36 in the vicinity (e.g. due to temporary bridging between electrodes on surface 43) thus offering a further degree of protection of control circuitry 49. Cg should be approximately equal to Cp to provide a one-half reduction in the amplitude of cross-talk and a similar reduction in fringe field width while requiring only a reasonable increase in drive current capability.

In the embodiment of FIG. 5, the capacitance Cg will be slightly greater than capacitance Cp due to the somewhat greater expected capacitance from a plane to a cylinder (i.e. substrate to fiber) as compared to the capacitance between cylinders (i.e. fiber to fiber). Also, with the embodiment of FIG. 5, adjacent ones of fibers 36 may be separated by a dimension equal to about twice the thickness of insulation sheath 52 (assuming $C_c \cong D_c$) while only a single thickness of insulation sheath 52 will separate fibers 36 from support 40 resulting in potentially different capacitance since the capacitance is inversely proportional to the spacing between fibers 36. Compensation for such effect and improved dielectric reliability can be achieved by applying an insulation layer 62 upon support 40 so as to achieve a similar separation distance between fibers 36 and support 40 on the one hand as compared to adjacent fibers 36 on the other hand.

While fibers 36 and 38 are shown in the accompanying drawings as having a circular cross-sectional shape, any other non-circular or other geometrically shaped cross-section can be advantageously utilized, the selection of any particular shape being well within the skill of those in this art. Thus, for example, monofilament or multifilament wires or ribbons having triangular, square, or rectangular cross-sections and the like can be suitably used.

While the present invention has been herein described in what is presently conceived to be the most preferred embodiment thereof, those in this art may recognize that many modifications may be made hereof which modifications shall be accorded the broadest scope of the appended claims so as to encompass all equivalent structures and/or assemblies.

What is claimed is:

1. An electrode structure for a fluid jet printing apparatus comprising a woven fabric having plural electrically-conductive fibers interwoven with plural electrically-insulative fibers and support means supporting and electrically insulating said woven fabric, said support means having an edge over which said electrically-conductive fibers pass in parallel to define the forward face of said electrode structure.

2. An electrode structure as in claim 1 wherein said electrically-conductive fibers are substantially perpendicular to said electrically-insulative fibers.

3. An electrode structure as in claim 2 wherein said electrically-insulative fibers each consist essentially of a polymeric material.

4. An electrode structure as in claim 3 wherein said electrically-insulative fibers are monofilament fibers.

5. An electrode structure as claim 1 wherein said electrically-conductive and electrically-insulative fibers have nominal diameters of about 5 mils.

6. An electrode structure as in claim 1 wherein said electrically-conductive fibers consist essentially of copper, stainless steel or brass.

7. An electrode structure for a fluid jet printing apparatus comprising:

plural first fiber means having a portion positionable adjacent to a plurality of fluid droplet streams for generating electrostatic fields through which said droplet streams pass;

insulating means for electrically insulating said plural electrically-conductive fiber means one from another, said insulating means including plural second fiber means interwoven at predetermined intervals with said plural first fiber means to electrically insulate each first fiber means one from another; and support means supporting and electrically insulating said interwoven pluralities of said first and second fiber means, said first fiber means passing in parallel over said support means to define the forward face of said electrode.

8. An electrode as in claim 7 wherein said support means comprises an electrically-insulative material and wherein portions of said plural first fiber means are machined so as to form a plurality of substantially planar charging surfaces.

9. An electrode as in claim 7 wherein said support means comprises an electrically-conductive material.

10. A charge electrode for use in a fluid jet printing apparatus to electrostatically charge selected fluid droplets in a plurality of droplet streams so that said selected charged fluid droplets can be deflected from a normal droplet path towards a catching structure while uncharged droplets proceed along said droplet path to be deposited upon a print medium, said charge electrode comprising a woven fabric having plural electrically-conductive warp fibers, plural weft fibers, means for electrically insulating said warp fibers one from another, and means for establishing a charge area of said plural warp fibers adapted to be positioned adjacent said droplet streams.

11. A charge electrode as in claim 10 wherein each said plural weft fiber comprises an electrically-insulative material to at least partially establish said means for electrically insulating said warp fibers.

12. A charge electrode as in claim 10 wherein said means for establishing said charge area includes support means defining a forward face, said woven fabric being disposed over said forward face so as to establish thereat said charge area.

13. A charge electrode as in claim 12 wherein said support means comprises an electrically-insulative material to at least partially establish said means for electrically insulating said warp fibers.

14. A charge electrode for a fluid jet printing apparatus to electrostatically charge selected fluid droplets in a plurality of fluid droplet streams comprising plural electrically-conducting filaments interwoven with plural electrically-insulating filaments and support means for supporting and electrically insulating said interwoven pluralities of filaments and having an edge over which said electrically-conductive fibers pass in parallel to define the forward face of said electrode, wherein a portion of said electrically-conducting filaments is positionable adjacent and parallel to said droplet streams.

15. A charge structure for a fluid jet printing apparatus to electrostatically charge selected fluid droplets in a plurality of fluid droplet streams comprising (a) plural electrically-conducting filaments each having a portion thereof extending in one direction so as to be alignable in parallel with said droplet streams, (b) plural electrically-insulating filaments interwoven with said plural electrically-conducting filaments and extending in a second direction substantially transverse to said one direction, and (c) support means to support and electrically insulate said interwoven pluralities of filaments and to position a portion of said plural electrically-conducting filaments in alignment with said droplet streams.

16. A fluid jet printing apparatus for the printing of fluid droplets onto a print medium comprising (a) means for generating plural streams of droplets along a normal droplet path to be deposited upon said print medium; (b) charging means for electrostatically charging selected ones of said droplets; (c) electrostatic deflection means for deflecting said selected ones from said normal droplet path; and (d) droplet catching means for catching said deflected selected ones of said droplets, wherein said charging means includes:

a woven fabric structure having (i) plural electrically-conductive warp fiber means substantially parallel and spaced apart relative to one another, and (ii) plural electrically-insulative weft fiber means woven with said warp fiber means at predetermined intervals, said weft fiber means for electrically insulating said plural warp fiber means one from another; and support means to support said woven fabric structure and to position a predetermined portion of said plural warp fiber means adjacent said droplet path whereby said portion establishes an electrostatic charge area through which said plural streams pass.

17. A fluid jet printing apparatus as in claim 16 wherein said support means comprises an electrically-insulative material.

18. A fluid jet apparatus as in claim 16 wherein said plural warp fibers are in substantial parallel alignment relative to said droplet path.

19. A woven fabric structure electrode in a fluid-jet printer of the type having means for generating plural streams of droplets along a normal droplet path to be deposited upon said print medium, charging means for electrostatically charging selected ones of said droplets, electrostatic deflection means for deflecting said selected ones from said normal droplet path, and droplet catching means for catching said deflected selected ones of said droplets, said woven fabric structure comprising plural first electrically-conductive fibers interwoven with plural second electrically-insulative fibers.

20. A woven fabric structure as in claim 19 wherein said first fibers are metallic fibers.

21. A woven fabric structure as in claim 20 wherein said metallic fibers comprises copper, stainless steel or brass.

22. A woven fabric structure as in claim 19 wherein said second fibers are polymeric fibers.

23. A woven fabric structure as in claim 22 wherein said polymeric fibers consist essentially of polyolfines, polyethylene terephthalates, acrylics, polysulfones, polyamide-imides or polyimides.

24. A woven fabric structure as in claim 19 wherein said first and second fibers have nominal diameters of about 5 mils.

25. A woven fabric structure as in claim 19 wherein said first and second fibers are monofilament fibers.

26. An electrode structure for a fluid jet printing apparatus comprising:

plural electrically-conductive fiber means having a portion positionable adjacent to fluid droplet streams for selectively generating discrete electrostatic fields through which selected droplets pass; and means for preventing electrostatic cross-coupling of adjacent ones of said fiber means including (a) an electrically-conductive, grounded support means for supporting said plural fiber means in substantially parallel disposition, and (b) insulating means to electrically insulate said fiber means from said support means.

27. An electrode as in claim 26 wherein each said fiber means includes an electrically-conductive core and wherein said insulating means includes an electrically-insulative sheath surrounding said core.

28. An electrode as in claim 27 wherein said insulating means further includes a layer of electrically insulating material formed on a surface of said support means between said support means and said fiber means.

29. An electrode as in claim 26 further comprising plural electrically-insulative fiber means interwoven with said electrically-conductive fiber means.

30. An electrode structure for a fluid jet printing apparatus comprising:

plural first fiber means having a portion positionable adjacent to a plurality of fluid droplet stream for generating electrostatic fields through which said droplet stream pass;

insulating means for electrically insulating said plural electrically-conductive fiber means one from another, said insulating means including plural second fiber means interwoven at predetermined intervals with said plural first fiber means to electrically insulate each first fiber means one from another; and support means for supporting said first and second fiber means, said support means defining the forward face of said electrode structure and being adhesively bonded to said interwoven pluralities of said first and second fiber means, said first and second fiber means being disposed over said forward face and portions of said plural first fiber means being machined so as to form a plurality of substantially planar charging surfaces.

* * * * *